March 3, 1964  N. L. WOOGE  3,123,058
INTERNAL COMBUSTION ENGINE
Filed March 19, 1962  2 Sheets-Sheet 1

INVENTOR.
NORMAN L. WOOGE
BY
Fishburn and Gold
ATTORNEYS

March 3, 1964 N. L. WOOGE 3,123,058
INTERNAL COMBUSTION ENGINE
Filed March 19, 1962 2 Sheets-Sheet 2

INVENTOR.
NORMAN L. WOOGE
BY
Fishburn and Gold
ATTORNEYS

United States Patent Office 3,123,058
Patented Mar. 3, 1964

3,123,058
INTERNAL COMBUSTION ENGINE
Norman L. Wooge, 934 N. 82nd Terrace, Apt. A, Kansas City, Mo.
Filed Mar. 19, 1962, Ser. No. 180,481
4 Claims. (Cl. 123—55)

This invention relates to internal combustion engine and more particularly to internal combustion engines of the radially disposed piston type.

The principal objects of the present invention are: to provide an internal combustion engine of the radially disposed piston type which is of simple and light-weight construction; to provide such an engine having a vertically extending tubular crankcase with a plurality of spider-like supports therein for rotatably mounting the crankshaft; to provide an engine of six cylinders which requires only two throws or cranks on the crankshaft; to provide a simplified, smooth-running engine construction wherein the longitudinal splitting of the crankcase is not necessary in order to obtain access therewithin for overhauling or servicing internal engine parts; to provide such a device wherein the crankshaft, connecting rods, and pistons may be removed from the engine longitudinally of the crankcase from upper and lower crankcase openings; to provide such an engine wherein crankshaft bearing support legs also support a plurality of camshafts for operating the cylinder valves; to provide such an engine construction wherein the cylinders are located in three pairs which are respectively circumferentially symmetrically disposed in radially extending relation about the crankcase; to provide such an engine configuration wherein the cylinders of each pair of cylinders are axially adjacent each other in vertical planes containing the axis of the crankshaft; to provide an engine cylinder placement wherein pairs of cylinders are offset from the next adjacent pair of cylinders axially of the crankshaft; and to provide such an engine construction having a downwardly extending output shaft integral with the crankshaft for easily adapting the engine for rear mounting in a vehicle.

Other objects and advantages of this invention will become apparent from the following description taken in connection with the accompanying drawings wherein are set forth by way of illustration and example certain embodiments of this invention.

Figure 1:
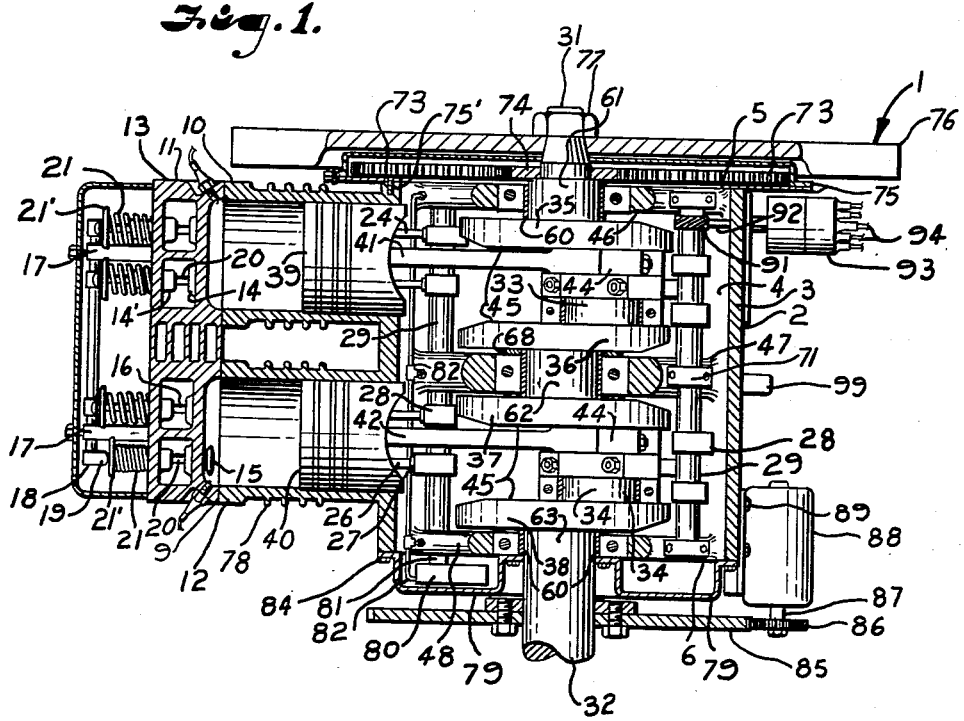
FIGURE 1 is a cross-sectional view in side elevation through an internal combustion engine embodying this invention showing the crank case interior.

Referring to the drawings in more detail, the reference numeral 1 generally indicates an internal combustion engine embodying features of this invention. The engine 1 comprises an engine block 2 which is preferably of lightweight metal such as aluminum. The block 2 is shaped to form a vertically extending integral tubular crankcase 3 having an inner cylindrical surface 4 and a circular open upper end 5 and a circular open lower end 6. The block 2 in the illustrated example includes three pairs 7, 8 and 9 of compression and combustion cylinders 10 making a total of six cylinders, however, it is to be understood that other cylinder totals may be used. Each pair of cylinders 10 has an upper cylinder 11 and a lower cylinder 12 and the pairs of cylinders 7, 8 and 9 are circumferentially symmetrically disposed in radially outwardly extending relation about the crankcase 3. The cylinders 11 and 12 of each pair of cylinders are axially adjacent each other in respective vertical planes containing the axis of the crankcase 3. Each pair of cylinders is slightly offset from the next adjacent pair of cylinders axially of the crankcase for a purpose which will become apparent hereinafter.

A cylinder head 13 is provided for each pair 7, 8 and 9 of cylinders 10 and contains suitable valve seats 14 and guides 14' for cooperating with slidably supporting intake and exhaust valves 15 and 16 in the usual manner. A plurality of posts 17 are secured to the cylinder heads 13 and support at the upper ends thereof rocker arms 18. The rocker arms 18 extend laterally of the respective posts 17 with which they are associated and are adapted to contact at one end 19 thereof a valve stem 20 of a valve 15, 16. A valve spring 21 surrounds each valve stem 20 and urges respectively against the cylinder head 13 and a washer 21' engaged with the valve stem 20 for urging the valve away from the respective cylinder and into closing position. The other end 22 of each rocker arm 18 is engaged through a flexible coupling 23 with one end 23' of a push rod 24. The push rods 24 are longitudinally slidably retained in the cylinder heads 13 in guide passageways 25 extending therethrough. The other end 26 of the push rods 24 terminate in a flattened cam following surface 27 which is normally maintained in slidable engagement with a cam 28 fixed to a camshaft 29 described more fully hereinafter. The rotation of the camshaft 29 causes the push rods 24 to periodically reciprocate which results in the opening and closing of the valves associated therewith. The cam following surface 27 is generally maintained against the cam 28 through the action of the respective valve springs 21.

A vertically extending crankshaft 30 has an upper end 31 and a lower portion 32 forming an integral output shaft which is adapted to be operatably connected to a transmission or the like (not shown) for connecting the work output of the engine 1. The crankshaft 30 has an upper throw or crank 33 and an adjacent lower throw or crank 34 respectively located within the crankcase 3 and projecting laterally from the same side of the crankshaft 30 and both in a plane containing the axis of the crankshaft. Vertically spaced balance weights 35 and 36 are located on the opposite side of the crankshaft from the crank 33 and balance weights 37 and 38 are similarly located on the opposite side of the crankshaft from the crank 34.

Upper cylindrical pistons 39 and lower cylindrical pistons 40 are respectively slidably contained in the upper cylinders 11 and lower cylinders 12. Upper connecting rods 41 and lower connecting rods 42 are connected by means of wrist pins 43 respectively to the upper pistons 39 and lower pistons 40 forming three pairs of connecting rods corresponding to the three pairs of cylinders 7, 8 and 9. The upper connecting rods 41 are each connected to the upper crank 33 by means of suitable bearing caps 44 which bolt to the connecting rod in the usual manner. The lower connecting rods 42 are each connected to the lower crank 34 also with caps 44. The connecting rods connected to the respective cranks 33 and 34 are spaced laterally of each other in side to side contacting relation with the outer rods in contact with respective spaced parallel crank inner surfaces 45. Since each of the connecting rods are offset from the adjacent rod axially of the crankshaft, the cylinders receiving the respective pistons must also be offset from each other in order that the connecting rods can be connected in a position axially of the cylindrical pistons. By locating each pair of connecting rods in the same relative position on the cranks, the cranks in each pair of rods are vertically spaced an equal distance from each other and, therefore, the upper and lower cylinders in each pair 7, 8 and 9 of cylinders may also be spaced an equal distance from each other. The three pairs 7, 8 and 9 of cylinders, however, must be respectively slightly offset from each other axially of the crankcase 3 for properly receiving the respective pairs of connecting rods.

Upper, intermediate and lower structural "Y" supports or spiders respectively designated 46, 47 and 48 are adapted to support the crankshaft 30 co-axially of and within the crankcase 3. The spiders 46, 47 and 48 are respectively located above, between and beneath the cranks 33 and 34. The spiders 46, 47 and 48 each include a base leg 49 extending radially of the crankshaft 30 and having an inner end 50 terminating adjacent the axial center of the crankcase 3 and an outer end 51 secured to the inner cylindrical surface 4, for example, by casting or welding so as to be essentially integral therewith. The spiders 46, 47 and 48 each include a pair of side legs 52 and 53 respectively having inner portions 54 and 55 joining the base leg 49 adjacent the base leg inner end 50. The side legs 52 and 53 respectively have outer portions or ends 56 and 57 secured to the inner cylindrical surface 4 in the manner of the base leg outer end 51 and are spaced approximately 120° from each other and from said base leg outer end 51 on the surface 4.

The central juncture of the base leg 49 and side legs 52 and 53 of each spider forms a platform 58 adjacent the axial center of the crank case 3. A semi-cylindrical depression 59 extends across each platform 58 and has an axis co-incident with the axis of the inner cylindrical surface 4 of the crankcase 3. Bearing sleeves 60 which are preferably split for assembly in the well-known manner are received in the depressions 59 and rotatably mount the crankshaft 30 respectively on shaft portions 61, 62 and 63.

Figure 2:
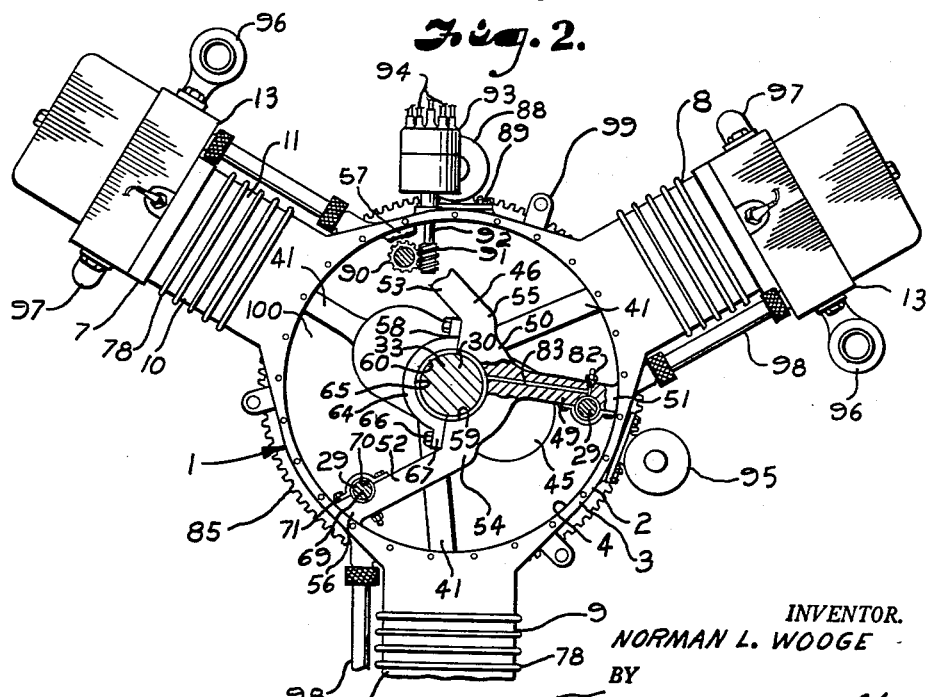
FIGURE 2 is a fragmentary top view of the engine with the fly wheel, crankcase top cover and timing gears removed showing the crankshaft mounting arms.
Figure 3:
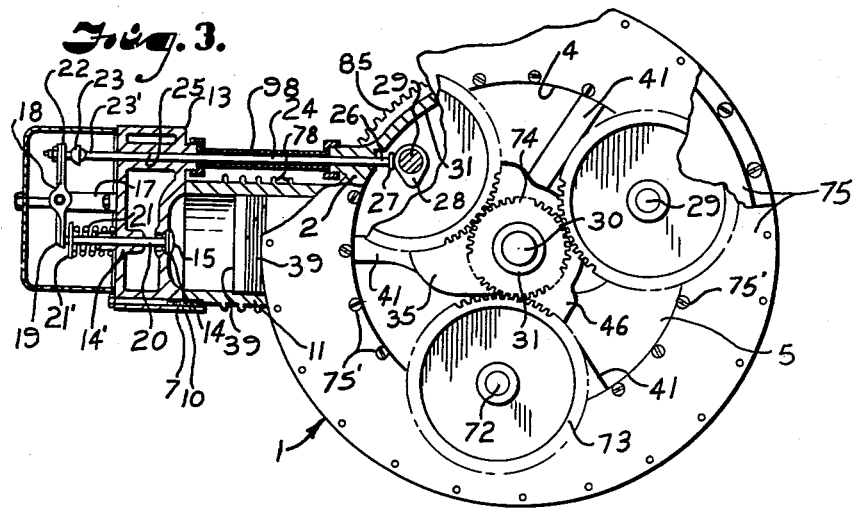
FIGURE 3 is a fragmentary top view of the engine showing the timing gears and the valve operating linkage cooperating therewith.
Figure 4:
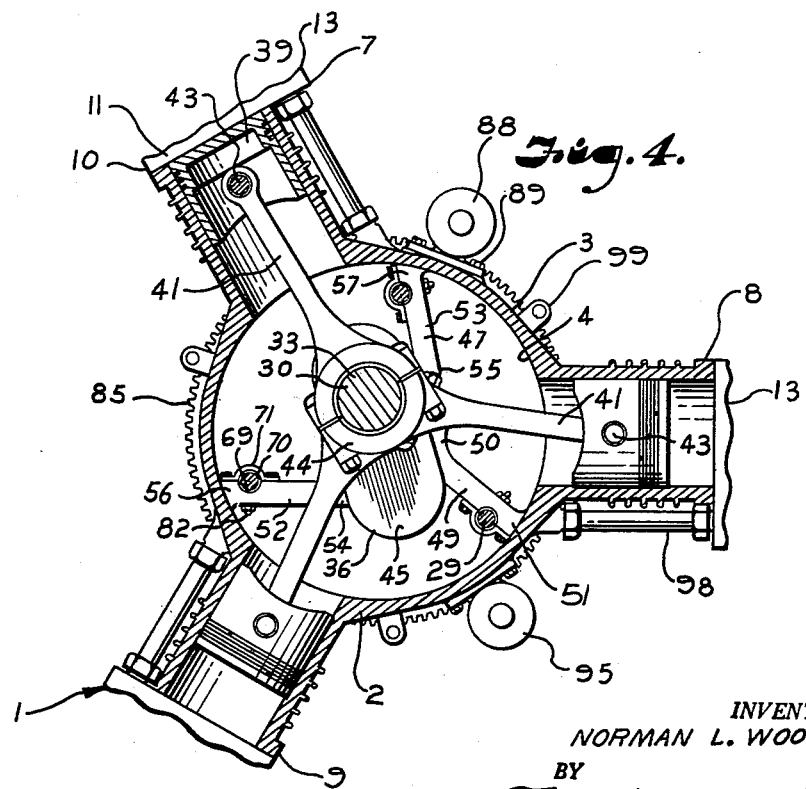
FIGURE 4 is a fragmentary cross-sectional top view through the engine particularly showing a plurality of connecting rods connected to a single crank of the crankshaft.

Cap or retainer members 64 each having a semi-cylindrical depression 65 extending thereacross are located in opposition to the platform depressions 59 when the retainer member is abutted against the platforms 58 as best illustrated in FIGURE 2. Suitable bolts 66 extend through side flanges 67 of the retainer members 64 and are threadedly engaged in the respective platforms 58 for removably securing the retainer members to the platforms for laterally supporting the bearing sleeves 60 in the depressions 59.

The intermediate spider 47 and the retainer member 64 assembled therewith are heavier in construction than the upper and lower spider 46 and 48 to provide additional support for the greater stress loads experienced in this area. The bearing sleeve 60 engaged with the intermediate spider 47 includes radially outwardly extending flanges or collars 68 which serve as thrust bearings to prevent unwanted axial movement of the crankshaft 30.

The base legs 49 and side legs 52 and 53 of the spiders 46, 47 and 48 have depressions 69 adjacent the outer ends thereof for receiving sleeve bearings 70 which in turn rotatably support camshafts 29 longitudinally parallel to and spaced circumferentially about the crankshaft 30 and within the crankcase 3. A cap or retaining member 71 is bolted to the legs of the respective spiders 46, 47 and 48 for retaining the bearings 70 thereon. It is to be understood that a cam shaft 29 is provided for each of the pairs 7, 8 and 9 of cylinders 10 for operating the respective valves associated therewith.

The upper ends 72 of the camshafts 29 have timing gears 73 fixed thereto. A timing gear 74 is fixed adjacent the upper end 31 of the crankshaft 30 and meshes with the three camshaft timing gears 73 for rotating the camshafts 29 in time relation to the rotation of the crankshaft.

A protective shield or covering 75 is secured to the upper end 5 of the crankcase 3 in the illustrated example by screws 75' to provide a closure to exclude foreign matter from the timing gears and the interior of the crankcase. A suitable fly wheel 76 preferably fashioned in the manner of an axial flow fan blade is secured to the upper end 31 of the crankshaft 30 by means of a nut 77 threadedly engaged therewith. When the engine is in operation the rotation of the fly wheel 76 causes an air flow across the respective cylinders and crankcase for maintaining the desired engine temperature. Suitable integral heat radiating fins 78 are provided on the exterior surface of each cylinder to aid in the cooling thereof.

An annular oil pan 79 is secured to and closes the lower end 6 of the crankcase 3. An oil pump 80 is contained in the oil pan and is operably connected to the lower end 81 of one of the camshafts 29 and is driven thereby. Suitable oil lines or tubes 82 communicate between the oil pump 80 and passageways 83 contained, among other places, in the legs of the spiders 46, 47, and 48 for transmitting oil under pressure to critical points throughout the engine requiring lubrication. Suitable threaded bolts 84 extend into the lower end 6 of the crankcase 3 and into the lower spider 48 for removably securing the oil pan 79 in the proper position against the crankcase.

A gear 85 is removably secured to the lower portion 32 of the crankshaft 30 and engages a fiber gear 86 fixed to the shaft 87 of a generator 88 which is secured to the outer surface of the block 2 by means of suitable bolts 89. When the engine is operated the generator 88 is driven to provide electrical power for any desired purpose.

One of the camshafts 29 has a spiral gear 90 fixed thereto and engaging a spiral gear 91 on a shaft 92 extending into a suitable distributor 93. The distributor 93 has electrical cables 94 extending therefrom for actuating spark plugs (not shown) engaged in the cylinder heads. In the illustrated example a conventional starter motor 95 is adapted to be engaged with the gear 85 for cranking the engine when desired.

Suitable intake passageways 96 and exhaust passageways 97 respectively carry an air-fuel mixture from carburetors (not shown) into the respective pairs of cylinders, and exhaust gases away. Sleeve members 98 are provided externally of the respective cylinders for enclosing the respective push rods 24 to provide protection and prevent the entrance of foreign matter between the push rod bearing surfaces and the push rods. Engine mounting lugs 99 are provided in radially and horizontally extending relation centrally of the block 3 for supporting the engine in a plane approximately extending through the center of gravity thereof.

When the parts closing the upper end 5 and lower end 6 of the crankcase are removed, access is provided within the crankcase for easily removing the crankshaft, connecting rods and pistons axially of the crankcase without resorting to a longitudinally extending splitting of the crankcase. It is to be understood that by removing the respective retainer members 64, the crankshaft is easily lifted out axially of the crankcase 3 in the space 100 provided between the respective side legs 52 and 53. The internal combustion engine above described is very simple in construction when compared to engines of similar performance and is easily inspected, maintained and overhauled when desired.

It is to be understood that while one form of this invention has been illustrated and described, it is not to be limited to this specific form or arrangement of parts herein described and shown except in so far as such limitations are included in the claims.

What I claim and desire to secure by Letters Patent is:
1. In an internal combustion engine:
 (a) an engine block shaped to form a crankcase having an inner surface and an open end,
 (b) said block having a plurality of compression and combustion cylinders circumferentially disposed in radially extending relation about said crankcase,
 (c) a crankshaft having a plurality of cranks located within said crankcase, said crankcase being non-splitting longitudinally of said crankshaft,
(d) pistons slidably contained in each of said cylinders, a connecting rod operatively connected to each piston, a plurality of said connecting rods rotatably connected to each of said cranks,
(e) a plurality of spiders for supporting said crankshaft within said crankcase, said spiders being located at spaced points along said crankshaft,
(f) said spiders each including a base leg extending radially of said crankshaft and having an inner end terminating adjacent the axial center of said crankcase and an outer end secured to said surface,
(g) said spiders each including a pair of side legs each having an inner end joining said base leg inner end, said side legs respectively extending radially outwardly from said base leg inner end and having outer ends secured to said surface and spaced from each other defining a space therebetween,
(h) the juncture of said legs forming spaced platforms adjacent the axial center of said crank case
(i) removable bearing means secured to said platforms for rotatably mounting said crankshaft, and
(j) a removable closure member for selectively opening and closing said end of said crankcase, whereby access is provided through said end of said crankcase for removing said pistons, connecting rods and crankshaft from said crankcase through the spaces between said spider side legs without splitting said crankcase.

2. The structure of claim 1 wherein:
(a) said cylinders are circumferentially disposed in radially extending relation about said crankcase.

3. The structure as set forth in claim 1 wherein said engine includes only six of said cylinders and said cylinders are symmetrically disposed about said crankcase in three pairs, the axes of each of said cylinder pairs being contained in a plane containing the axis of said crankshaft, said cranks being only two in number and projecting laterally in the same direction from the axis of said crankshaft, one connecting rod from each of said cylinder pairs being rotatably connected to one of said cranks.

4. The structure as set forth in claim 3 including a valve set for each of said cylinders and a camshaft for each of said cylinder pairs for controlling the respective valve sets of each cylinder pair, said camshafts respectively being rotatably supported on said spider legs.

References Cited in the file of this patent

UNITED STATES PATENTS

| | | |
|---|---|---|
| 1,285,861 | White | Nov. 26, 1918 |
| 1,811,625 | Greening et al. | June 23, 1931 |
| 1,819,323 | Evinrude | Aug. 18, 1931 |
| 2,030,995 | Loeffler | Feb. 18, 1936 |
| 2,079,571 | Johnson | May 4, 1937 |
| 2,178,246 | Towle | Oct. 31, 1939 |
| 2,317,154 | Taber | Apr. 20, 1943 |

FOREIGN PATENTS

| | | |
|---|---|---|
| 269,713 | Great Britain | Apr. 28, 1927 |